United States Patent
Lee

(10) Patent No.: US 10,750,114 B2
(45) Date of Patent: *Aug. 18, 2020

(54) METHOD FOR CONTROLLING CURVATURE OF ADJUSTABLE CURVED-SURFACE DISPLAY AND CURVED-SURFACE DISPLAY APPARATUS

(71) Applicants: HKC Corporation Limited, Shenzhen, Guangdong (CN); Chongqing HKC Optoelectronics Technology Co., Limited, Chongqing (CN)

(72) Inventor: Chia-Hang Lee, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 301 days.

This patent is subject to a terminal disclaimer.

(21) Appl. No.: 15/735,224

(22) PCT Filed: Mar. 24, 2017

(86) PCT No.: PCT/CN2017/078126
§ 371 (c)(1),
(2) Date: Dec. 11, 2017

(87) PCT Pub. No.: WO2018/120464
PCT Pub. Date: Jul. 5, 2018

(65) Prior Publication Data
US 2020/0036935 A1 Jan. 30, 2020

(30) Foreign Application Priority Data

Dec. 31, 2016 (CN) .......................... 2016 1 1268297

(51) Int. Cl.
H04N 5/64 (2006.01)
G06T 7/70 (2017.01)
(Continued)

(52) U.S. Cl.
CPC ........... *H04N 5/64* (2013.01); *G06K 9/00255* (2013.01); *G06T 7/70* (2017.01); *H04N 5/2253* (2013.01);
(Continued)

(58) Field of Classification Search
None
See application file for complete search history.

(56) References Cited

U.S. PATENT DOCUMENTS 9,625,942 B2 * 4/2017 Cho ........................ G06F 3/013
10,297,234 B2 * 5/2019 Ekambaram ........... G09G 3/003
(Continued)

FOREIGN PATENT DOCUMENTS

CN 103854571 A 6/2014
CN 104143296 A 11/2014
(Continued)

OTHER PUBLICATIONS

International Search Report for PCT/CN2017/078126, dated Jun. 1, 2017.

*Primary Examiner* — Reza Aghevli
(74) *Attorney, Agent, or Firm* — Juan Carlos A. Marquez; Marquez IP Law Office, PLC

(57) ABSTRACT

This application relates to a method for controlling a curvature of an adjustable curved-surface display and a curved-surface display apparatus. The control method includes: capturing a scene picture information according to an image sensor mounted on a curved-surface display; calculating a location of a viewer in the scene picture information according to a processing unit; calculating an angle between the (Continued)

viewer and a central line of the curved-surface display according to the location; calculating optimal visual angle information according to the angle; and obtaining an optimal curvature according to the optimal visual angle information, to control a display surface bending distance of the curved-surface display.

15 Claims, 4 Drawing Sheets

(51) Int. Cl.
    *G06T 9/00* (2006.01)
    *H04N 5/44* (2011.01)
    *G06K 9/00* (2006.01)
    *H04N 5/225* (2006.01)

(52) U.S. Cl.
    CPC ..... *H04N 5/44* (2013.01); *G06T 2207/30196* (2013.01)

(56) References Cited

U.S. PATENT DOCUMENTS

| | | | |
|---|---|---|---|
| 10,360,876 B1* | 7/2019 | Rahman | G01S 3/802 |
| 10,401,664 B2* | 9/2019 | Lei | G02F 1/133308 |
| 2014/0253722 A1* | 9/2014 | Smyth | G01P 3/38 |
| | | | 348/135 |
| 2014/0267097 A1* | 9/2014 | Lee | G06F 3/0412 |
| | | | 345/173 |
| 2015/0145837 A1* | 5/2015 | Park | H04N 5/64 |
| | | | 345/184 |
| 2015/0222880 A1* | 8/2015 | Choi | G03B 37/04 |
| | | | 348/43 |
| 2015/0278995 A1* | 10/2015 | Nakahata | G06T 3/4038 |
| | | | 382/275 |
| 2015/0316957 A1* | 11/2015 | Cho | G06F 1/1601 |
| | | | 345/156 |
| 2016/0054512 A1* | 2/2016 | Zhou | G02B 6/0068 |
| | | | 362/613 |
| 2016/0100119 A1* | 4/2016 | Lee | H04N 5/2628 |
| | | | 348/571 |
| 2016/0278246 A1* | 9/2016 | Yu | G02F 1/133305 |
| 2017/0127535 A1* | 5/2017 | Shin | G02F 1/1333 |
| 2017/0188021 A1* | 6/2017 | Lo | H04N 3/08 |
| 2018/0374398 A1* | 12/2018 | Lee | H04N 21/4223 |

FOREIGN PATENT DOCUMENTS

| | | | | |
|---|---|---|---|---|
| CN | 104966464 A | 10/2015 | | |
| KR | 20140019058 A | 2/2014 | | |
| WO | WO-2015167218 A1 * | 11/2015 | | G06F 1/1601 |
| WO | WO-2016078104 A1 * | 5/2016 | | H05K 5/0017 |
| WO | WO-2016082337 A1 * | 6/2016 | | G06F 1/1601 |

* cited by examiner

METHOD FOR CONTROLLING CURVATURE OF ADJUSTABLE CURVED-SURFACE DISPLAY AND CURVED-SURFACE DISPLAY APPARATUS

BACKGROUND

Technical Field

This application relates to a method for controlling a curved-surface display, and in particular, to a method for controlling a curvature of an adjustable curved-surface display and a curved-surface display apparatus.

RELATED ART

In the prior art, an LED curved surface is not an original curved-surface screen, and a plane is bent by changing physical characteristics, so that physical attributes of a flat panel are changed. An LED includes many components. When a screen becomes a curved surface, these components do not become curve-shaped accordingly. This is a main reason why an LED curved-surface television is relatively thick and even a back thereof is still designed as a plane. Because flexibility of an LED screen is relatively poor, relatively great technical disadvantages exist in physical bending.

Currently, a curved-surface screen presents visual advantages only when the curved-surface screen is a large screen, thereby forming surround viewing experience. Therefore, if a size of a flat panel television is 55 inches, to achieve similar effects, a curved-surface television needs to be at least 65 inches.

For a curved-surface television, a principle that a curved screen is more visually suitable is emphasized, and actually, to present this visual effect, a viewer needs to sit at a location of a central point of the television. That is, if the television is viewed at another location, not only an ideal visual effect cannot be achieved, but also a picture has a twist effect due to bending of the screen. In fact, when a television is viewed by a family, it is impossible that several people are crowded at a central point of the television.

Currently, the curved-surface design is used in more televisions mainly because of not only a novel appearance design, but also prominent performance in picture quality of televisions, and in particular, because when a conventional flat panel LCD (either a VA-type LCD or an IPS-type LCD) television is viewed at a large visual angle, a specific chromatic aberration generally exists between the large visual angle and a central visual angle. Consequently, picture quality is poorer when the visual angle is greater.

A manner for improving a conventional flat panel LCD visual angle is dividing one pixel into two sub-pixels, namely, a sub-pixel A and a sub-pixel B, and compensating and improving a chromatic aberration of a side visual angle by controlling gamma curves of the sub-pixel A and the sub-pixel B according to a voltage. Such a compensation method is referred to as a space pixel compensation method.

In addition, another method for improving picture quality of a visual angle is using a manner for designing a curved-surface display, that is, for a specified observation distance, calculating a corresponding curvature of the display. Generally, a curvature of a display is about R2000, and a curvature of a television is designed to be about R4000. At an appropriate curvature and a proper observation distance, visual angles of a display are consistent with a central visual angle. Therefore, a picture quality degradation problem of a screen due to different visual angles is alleviated.

Conventionally, a curved-surface display is designed for a single observer at on-axis coordinate location (that is, a central location). However, when a television is watched, usually, there is not always one observer, and the viewer does not always perform observation at a central location. Therefore, for a condition for which a curved-surface television has an optimal visual angle, optimal picture quality cannot be obtained because of different locations of the observer.

SUMMARY

To resolve the foregoing technical problem, this application is directed to providing a method for controlling a curved-surface display, and in particular, to a method for controlling a curvature of an adjustable curved-surface display, where a curvature of a display surface of a display is automatically adjusted to an optimal curvature for one or more viewers at different locations.

The objective of this application is implemented and the technical problem thereof is resolved according to the following technical solutions. A method for controlling a curvature of an adjustable curved-surface display provided according to this application comprises: capturing a scene picture information according to an image sensor mounted on a curved-surface display; calculating a location of a viewer in the scene picture information according to a processing unit; calculating an angle between the viewer and a central line of the curved-surface display according to the location; calculating optimal visual angle information according to the angle; and obtaining an optimal curvature according to the optimal visual angle information, to control a display surface bending distance of the curved-surface display.

Another objective of this application is to provide a curved-surface display apparatus, comprising: an image sensor, configured to capture a scene picture information; and a processing unit, connected to the image sensor and configured to calculate a location of a viewer in the scene picture information, where an angle between the viewer and the central line of the curved-surface display is calculated according to the location; optimal visual angle information is calculated according to the angle; and an optimal curvature is obtained according to the optimal visual angle information, to control a display surface bending distance of the curved-surface display apparatus.

The objective of this application may be further implemented and the technical problem thereof may be further resolved by taken the following technical measures.

In an embodiment of this application, the scene picture information is used by the image sensor for capturing information of a space situated with the viewer.

In an embodiment of this application, the image sensor is a plurality of image sensors.

In an embodiment of this application, the image sensor comprises a wide-angle lens.

In an embodiment of this application, the processing unit comprises a face recognition system, configured to recognize a quantity of viewers in the scene picture information.

In an embodiment of this application, the location is a distance between the viewer and the central line of the curved-surface display and a straight line distance between the viewer and the curved-surface display.

In an embodiment of this application, if the viewer is located on the left of the central line of the curved-surface display and is X1 away from the central line, and the straight line distance between the viewer and the curved-surface display is D, the angle θL is arctan(−X1/D), and if the viewer is located on the right of the central line of the curved-surface display and is X2 away from the central line, and the straight line distance between the viewer and the curved-surface display is D, the angle θR is arctan(X2/D), and the optimal visual angle information is θeff=(θL+θR)/2.

In an embodiment of this application, the optimal visual angle information is θeff=(θL+θR)/2 and may be equal to a formula $$\theta_{\mathit{eff}} = \frac{1}{n}\sum_{k=0}^{n}\theta_k,$$

where n is a quantity of viewers.

In an embodiment of this application, the θeff is in a range of 0 to 90 degrees, the optimal curvature is in a range of 4000 R to a plane, and the display surface bending distance is in a range of 50 mm to 0 mm.

In an embodiment of this application, the curved-surface display apparatus further comprises software or a corresponding program, to execute the method for a curvature of an adjustable curved-surface display.

In this application, an intelligent method for automatically controlling a curvature of a display is designed by means of an image sensor apparatus and analysis of a processing unit. As compared with a conventional television with a fixed curvature, this application not only is more flexible, but also is closer to an application status of an actual viewer, thereby greatly improving picture quality viewed by a viewer at different visual angles.

DETAILED DESCRIPTION

The following embodiments are described with reference to the accompanying drawings, which are used to exemplify specific embodiments for implementation of this application. Terms about directions mentioned in this application, such as "on", "below", "front", "back", "left", "right", "in", "out", and "side surface", merely refer to directions of the accompanying drawings. Therefore, the used terms about directions are used to describe and understand this application, and are not intended to limit this application.

The accompanying drawings and the description are considered to be essentially exemplary, rather than limitative. In figures, units with similar structures are represented according to a same reference number. In addition, for understanding and ease of description, a size and a thickness of each component shown in the accompanying drawings are arbitrarily shown, but this application is not limited thereto.

In the accompanying drawings, for clarity, thicknesses of a layer, a film, a panel, an area, and the like are enlarged. In the accompanying drawings, for understanding and ease of description, thicknesses of some layers and areas are enlarged. It should be understood that when a component such as a layer, a film, an area, or a substrate is described to be "on" "another component", the component may be directly on the another component, or there may be an intermediate component.

In addition, in this specification, unless otherwise explicitly described to have an opposite meaning, the word "include" is understood as including the component, but not excluding any other component. In addition, in this specification, "on" means that a component is located on or below a target component, but does not mean that the component needs to be located on top of a gravity direction.

To further describe the technical means adopted in this application to achieve a predetermined invention objective and effects of this application, specific implementations, structures, features, and effects of a method for controlling a curvature of an adjustable curved-surface display and a curved-surface display apparatus provided according to this application are described in detail below with reference to the drawings and preferred embodiments.

Figure 1:
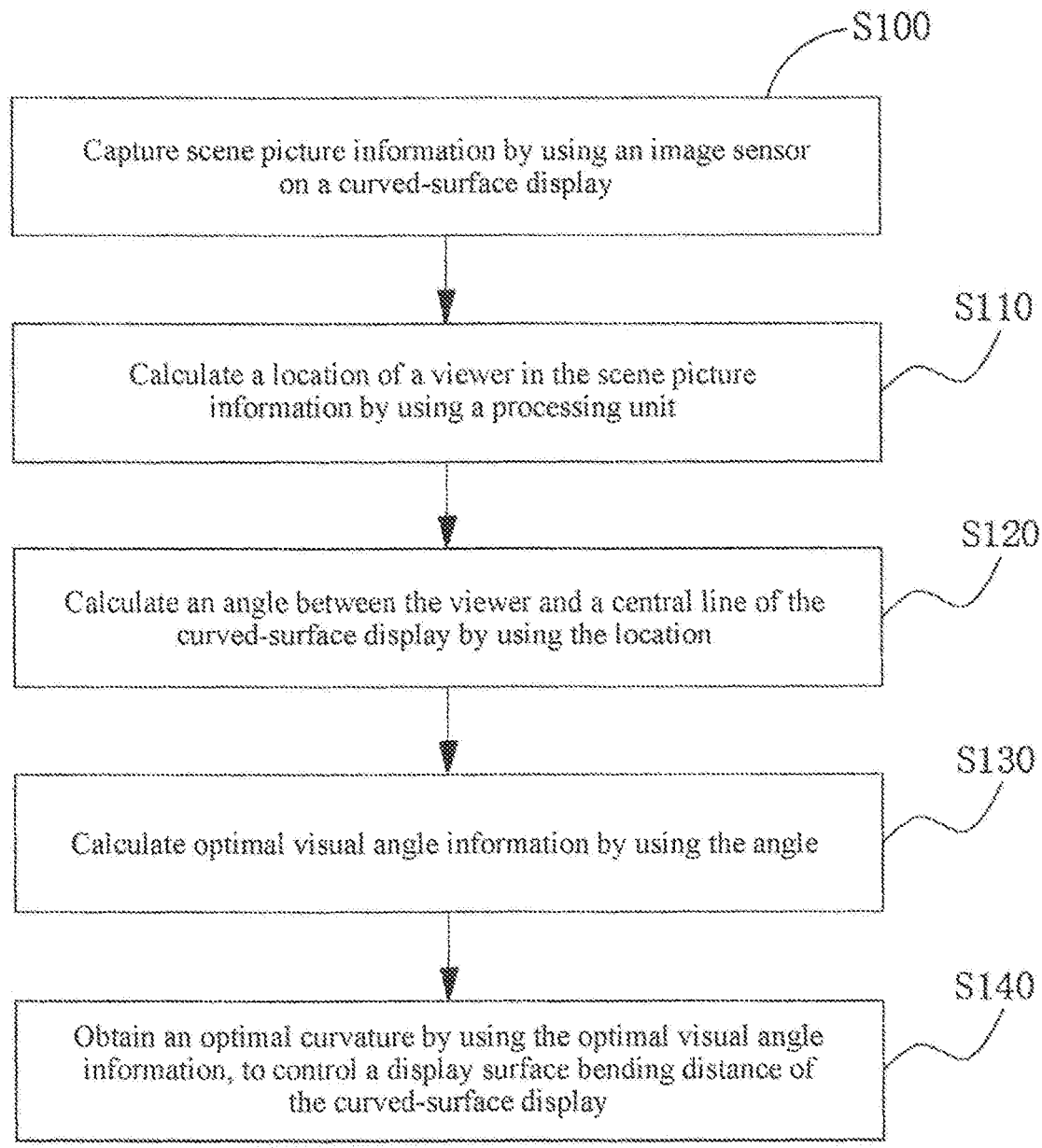
FIG. 1 is a flowchart of a method for controlling a curvature of an adjustable curved-surface display according to an embodiment of this application.
Figure 2:
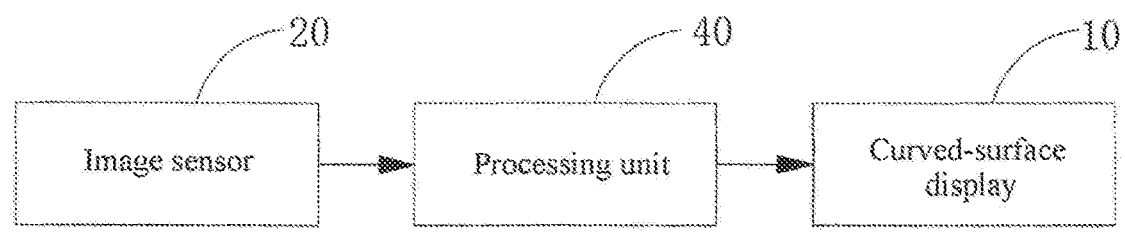
FIG. 2 is a block diagram of a method for controlling a curvature of an adjustable curved-surface display according to an embodiment of this application.
Figure 3:
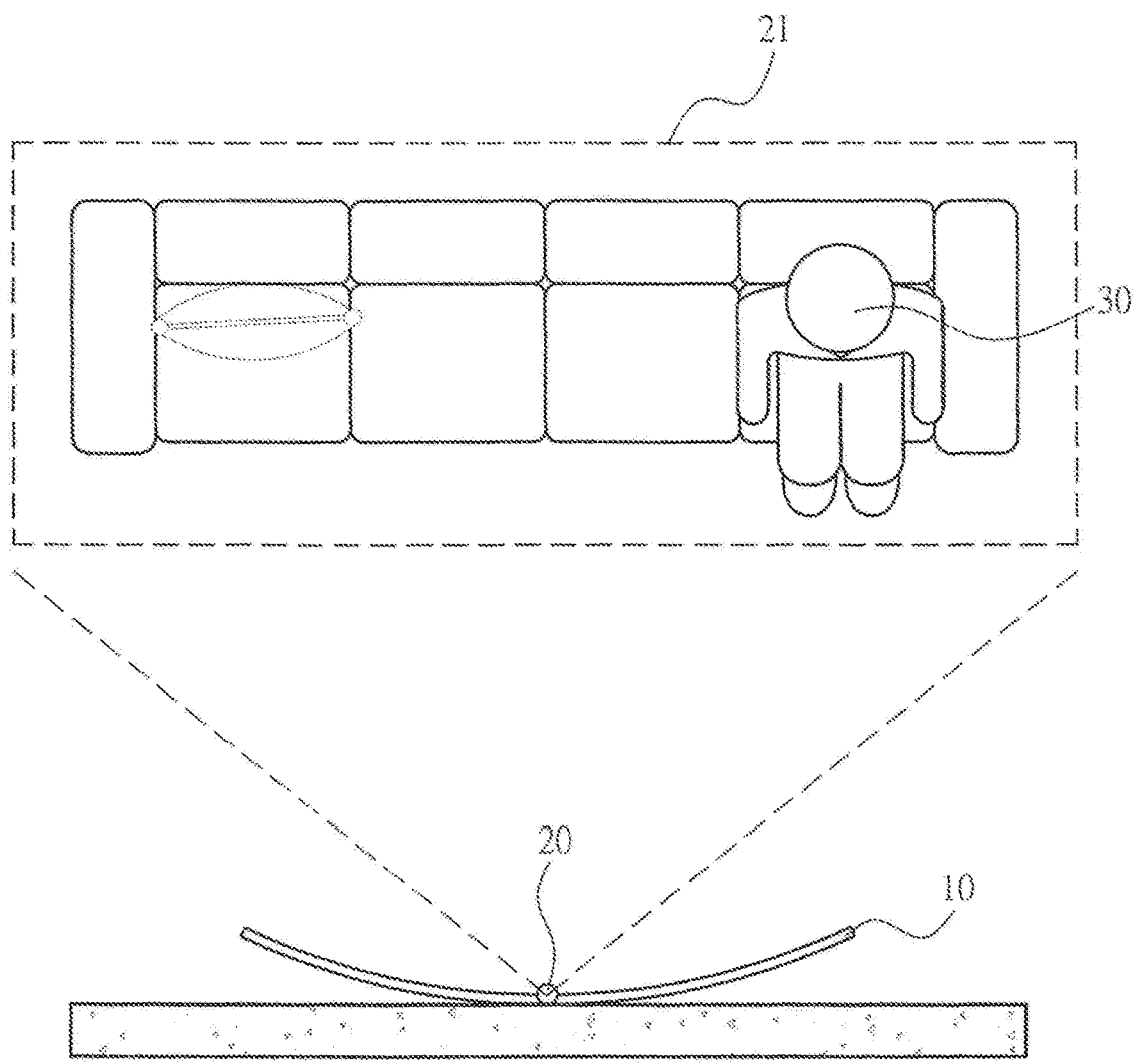
FIG. 3 is a schematic diagram of a method for controlling a curvature of an adjustable curved-surface display according to an embodiment of this application.
Figure 4:
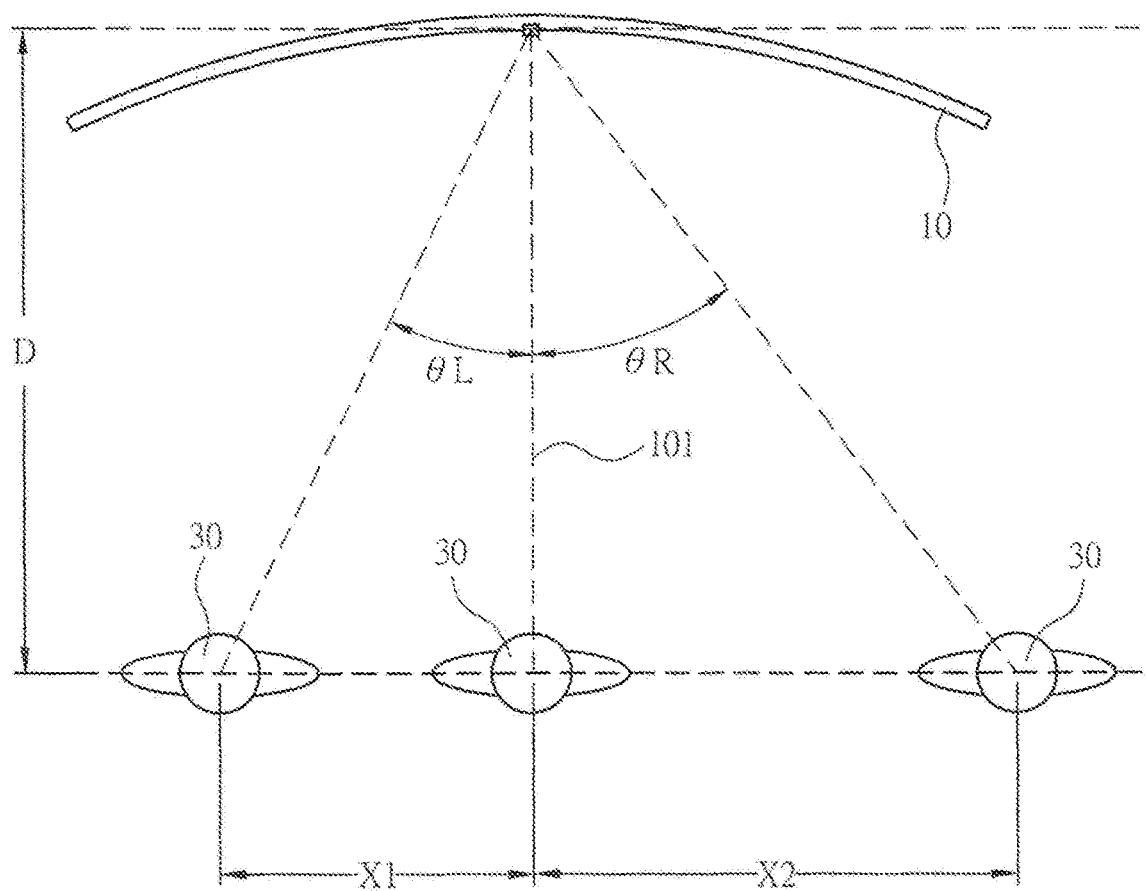
FIG. 4 is a schematic angle diagram of a method for controlling a curvature of an adjustable curved-surface display according to an embodiment of this application.

Referring to FIG. 1 to FIG. 4, FIG. 1 is a flowchart of a method for controlling a curvature of an adjustable curved-surface display according to an embodiment of this application, FIG. 2 is a block diagram of a method for controlling a curvature of an adjustable curved-surface display according to an embodiment of this application, FIG. 3 is a schematic diagram of a method for controlling a curvature of an adjustable curved-surface display according to an embodiment of this application, and FIG. 4 is a schematic angle diagram of a method for controlling a curvature of an adjustable curved-surface display according to an embodiment of this application. First referring to FIG. 1 and FIG. 3, a method for controlling a curvature of an adjustable curved-surface display of this application includes the following steps: step S100: Capture a scene picture information 21 according to an image sensor 20 mounted on a curved-surface display 10. In an embodiment of this application, the scene picture information 21 is used by the image sensor 20 for capturing information of a space situated with a viewer 30.

In an embodiment of this application, on the premise that the scene picture information 21 can be captured, the image sensor 20 is a plurality of image sensors, which may be respectively disposed at any locations on the curved-surface display 10.

In an embodiment of this application, on the premise that the scene picture information 21 can be captured, the image sensor 20 may include a wide-angle lens.

Subsequently, step S110: Referring to both FIG. 1 and FIG. 2, calculate a location of a viewer 30 in the scene picture information 21 according to a processing unit 40. In an embodiment of this application, the processing unit 40 includes a face recognition system, configured to recognize a face of the viewer 30 in the scene picture information 21, to determine a quantity of viewers 30.

In an embodiment of this application, referring to FIG. 4, the location is a distance X1 or X2 between the viewer 30 and a central line 101 of the curved-surface display and a straight line distance D between the viewer 30 and the curved-surface display 10, and the straight line distance D is parallel to the central line 101.

Subsequently, step S120: Referring to both FIG. 1 and FIG. 4, calculate an angle between the viewer 30 and a central line 101 of the curved-surface display 10 according to the location. If the central line 101 is used as a reference, the viewer 30 is located on the left of the central line 101 of the curved-surface display 10 and is X1 away from the central line 101, and the straight line distance between the viewer 30 and the curved-surface display 10 is D, the angle θL is arctan(−X1/D), and the θeff is in a range of 0 to 90 degrees, and if the viewer 30 is located on the right of the central line 101 of the curved-surface display 10 and is X2 away from the central line 101, and the straight line distance between the viewer 30 and the curved-surface display 10 is D, the angle θR is arctan(X2/D), and the θR is in a range of 0 to 90 degrees.

Subsequently, step S130: Calculate optimal visual angle information θeff=(θL+θR)/2 according to the angles θL and θR.

In an embodiment of this application, the optimal visual angle information is θeff=(θL+θR)/2 and may be equal to a formula $$\theta_{eff} = \frac{1}{n}\sum_{k=0}^{n}\theta_k,$$

where n may represent a quantity of viewers 30.

Subsequently, step S140: Obtain an optimal curvature according to the optimal visual angle information θeff, to control a display surface bending distance of the curved-surface display. In an embodiment of this application, this process may be completed, for example, by querying Table 1:

TABLE 1

| |θeff| | Optimal curvature | Display surface bending distance (mm) |
|---|---|---|
| 0 | 4000 R | 50 |
| 1 | 4100 R | 49 |
| 2 | 4200 R | 48 |
| 3 | 4300 R | 47 |
| . | . | . |
| . | . | . |
| . | . | . |
| 90 | plane | 0 |

In an embodiment of this application, according to Table 1, the θeff is in a range of 0 to 90 degrees, the optimal curvature is, for example, in a range of 4000 R to a plane, and the display surface bending distance is, for example, in a range of 50 mm to 0 mm.

According to the method for controlling a curvature of an adjustable curved-surface display of this application, this application further includes a curved-surface display apparatus. The curved-surface display apparatus may include software or a corresponding program, to execute the method for controlling a curvature of an adjustable curved-surface display. The curved-surface display apparatus includes: an image sensor, configured to capture a scene picture information; and a processing unit, connected to the image sensor and configured to calculate a location of a viewer in the scene picture information, where an angle between the viewer and the central line of the curved-surface display is calculated according to the location; optimal visual angle information is calculated according to the angle; and an optimal curvature is obtained according to the optimal visual angle information, to control a display surface bending distance of the curved-surface display apparatus.

Referring to FIG. 1 and FIG. 4 again, the method for controlling a curvature of an adjustable curved-surface display of this application includes the following steps: step S100: Capture a scene picture information 21 according to an image sensor 20 mounted on a curved-surface display 10. In an embodiment of this application, the scene picture information 21 is used by the image sensor 20 for capturing information of a space situated with a viewer 30.

In an embodiment of this application, on the premise that the scene picture information 21 can be captured, the image sensor 20 is a plurality of image sensors, which may be respectively disposed at any locations on the curved-surface display 10.

In an embodiment of this application, on the premise that the scene picture information 21 can be captured, the image sensor 20 may include a wide-angle lens.

Subsequently, step S110: Referring to both FIG. 1 and FIG. 2, calculate a location of a viewer 30 in the scene picture information 21 according to a processing unit 40. In an embodiment of this application, the processing unit 40 includes a face recognition system, configured to recognize a face of the viewer 30 in the scene picture information 21, to determine a quantity of viewers 30.

In an embodiment of this application, referring to FIG. 4, the location is a distance X1 or X2 between the viewer 30 and a central line 101 of the curved-surface display and a straight line distance D between the viewer 30 and the curved-surface display 10, and the straight line distance D is parallel to the central line 101.

Subsequently, step S120: Referring to both FIG. 1 and FIG. 4, calculate an angle between the viewer 30 and a central line 101 of the curved-surface display 10 according to the location. If the central line 101 is used as a reference, the viewer 30 is located on the left of the central line 101 of the curved-surface display 10 and is X1 away from the central line 101, and the straight line distance between the viewer 30 and the curved-surface display 10 is D, the angle θL is arctan(−X1/D), and the θeff is in a range of 0 to 90 degrees, and if the viewer 30 is located on the right of the central line 101 of the curved-surface display 10 and is X2 away from the central line 101, and the straight line distance between the viewer 30 and the curved-surface display 10 is D, the angle θR is arctan(X2/D), and the θR is in a range of 0 to 90 degrees.

Subsequently, step S130: Calculate optimal visual angle information θeff=(θL+θR)/2 according to the angles θL and θR.

In an embodiment of this application, the optimal visual angle information is θeff=(θL+R)/2 and may be equal to a formula $$\theta_{eff} = \frac{1}{n}\sum_{k=0}^{n}\theta_k,$$

where n may represent a quantity of viewers 30.

Subsequently, step S140. Obtain an optimal curvature according to the optimal visual angle information θeff, to control a display surface bending distance of the curved-surface display. In an embodiment of this application, this may be completed, for example, by querying Table 1.

In an embodiment of this application, according to Table 1, the θeff is in a range of 0 to 90 degrees, the optimal curvature is, for example, in a range of 4000 R to a plane, and the display surface bending distance is, for example, in a range of 50 mm to 0 mm.

In this application, an intelligent method for automatically controlling a curvature of a display is designed by means of an image sensor apparatus and analysis of a processing unit. As compared with a conventional television with a fixed curvature, this application not only is more flexible, but also is closer to an application status of an actual viewer, thereby greatly improving picture quality viewed by a viewer at different visual angles.

Terms such as "in some embodiments" and "in various embodiments" are repeatedly used. Usually, the terms do not refer to a same embodiment; but they may also refer to a same embodiment. Words such as "comprise", "have", "include" are synonyms, unless other meanings are indicated in the context.

The foregoing descriptions are merely preferred embodiments of this application, and are not intended to limit this application in any form. Although this application has been disclosed above through the preferred embodiments, the embodiments are not intended to limit this application. Any person skilled in the art can make some equivalent variations or modifications according to the foregoing disclosed technical content without departing from the scope of the technical solutions of this application to obtain equivalent embodiments. Any simple amendment, equivalent change or modification made to the foregoing embodiments according to the technical essence of this application without departing from the content of the technical solutions of this application shall fall within the scope of the technical solutions of this application.

What is claimed is:

1. A method for controlling a curvature of an adjustable curved-surface display, comprising:
   capturing a scene picture information according to an image sensor mounted on a curved display;
   calculating a location of a viewer in the scene picture information according to a processing unit;
   calculating an angle between the viewer and a central line of the curved-surface display according to the location;
   calculating an optimal visual angle information according to the angle; and
   obtaining an optimal curvature according to the optimal visual angle information, so to control a display surface bending distance of the curved-surface display;
   wherein the location is a distance between the viewer and the central line of the curved-surface display and a straight line distance between the viewer and the curved-surface display; and
   wherein if the viewer is located on the left of the central line of the curved-surface display and is X1 away from the central line, and the straight line distance between the viewer and the curved-surface display is D, the angle $\theta L$ is arctan($-X1/D$), and if the viewer is located on the right of the central line of the curved-surface display and is X2 away from the central line, and the straight line distance between the viewer and the curved-surface display is D, the angle $\theta R$ is arctan($X2/D$), and the optimal visual angle information is $\theta \text{eff} = (\theta L + \theta R)/2$.

2. The method for controlling a curvature of an adjustable curved-surface display according to claim 1, wherein the scene picture information is used by the image sensor for capturing information of a space situated with the viewer.

3. The method for controlling a curvature of an adjustable curved-surface display according to claim 2, wherein the image sensor is a plurality of image sensors.

4. The method for controlling a curvature of an adjustable curved-surface display according to claim 2, wherein the image sensor comprises a wide-angle lens.

5. The method for controlling a curvature of an adjustable curved-surface display according to claim 1, wherein the processing unit comprises a face recognition system, configured to recognize a quantity of viewers in the scene picture information.

6. The method for controlling a curvature of an adjustable curved-surface display according to claim 1, wherein the optimal visual angle information is
$\theta \text{eff} = (\theta L + \theta R)/2$ and may be equal to a formula $$\theta_{\mathit{eff}} = \frac{1}{n}\sum_{k=0}^{n}\theta_k,$$

wherein n is a quantity of viewers.

7. The method for controlling a curvature of an adjustable curved-surface display according to claim 6, wherein the $\theta \text{eff}$ is in a range of 0 to 90 degrees, the optimal curvature is in a range of 4000 R to a plane, and the display surface bending distance is in a range of 50 mm to 0 mm.

8. A curved-surface display apparatus, comprising:
   an image sensor, configured to capture a scene picture information; and
   a processing unit, connected to the image sensor and configured to calculate a location of a viewer in the scene picture information, wherein
   an angle between the viewer and a central line of the curved-surface display is calculated according to the location;
   optimal visual angle information is calculated according to the angle; and
   an optimal curvature is obtained according to the optimal visual angle information, to control a display surface bending distance of the curved-surface display apparatus;
   wherein the location is a distance between the viewer and the central line of the curved-surface display and a straight line distance between the viewer and the curved-surface display; and
   wherein if the viewer is located on the left of the central line of the curved-surface display and is X1 away from the central line, and the straight line distance between the viewer and the curved-surface display is D, the angle $\theta L$ is arctan($-X1/D$), and if the viewer is located on the right of the central line of the curved-surface display and is X2 away from the central line, and the straight line distance between the viewer and the curved-surface display is D, the angle $\theta R$ is arctan($X2/D$), and the optimal visual angle information is $\theta \text{eff} = (\theta L + \theta R)/2$.

9. The curved-surface display apparatus according to claim 8, wherein the scene picture information is used by the image sensor for capturing information of a space situated with the viewer.

10. The curved-surface display apparatus according to claim 9, wherein the image sensor is a plurality of image sensors.

11. The curved-surface display apparatus according to claim 9, wherein the image sensor comprises a wide-angle lens.

12. The curved-surface display apparatus according to claim 8, wherein the processing unit comprises a face recognition system, configured to recognize a quantity of viewers in the scene picture information.

13. The curved-surface display apparatus according to claim 8, wherein the optimal visual angle information is θeff=(θL+θR)/2 and may be equal to a $$\theta_{\mathit{eff}} = \frac{1}{n}\sum_{k=0}^{n}\theta_k,$$

formula wherein n is a quantity of viewers.

14. The curved-surface display apparatus according to claim 13, wherein the θeff is in a range of 0 to 90 degrees, the optimal curvature is in a range of 4000 R to a plane, and the display surface bending distance is in a range of 50 mm to 0 mm.

15. A method for controlling a curvature of an adjustable curved-surface display, comprising:
  capturing a scene picture information according to an image sensor mounted on a curved-surface display;
  calculating a location of a viewer in the scene picture information according to a processing unit;
  calculating an angle between the viewer and a central line of the curved-surface display according to the location;
  calculating optimal visual angle information according to the angle; and
  obtaining an optimal curvature according to the optimal visual angle information, to control a display surface bending distance of the curved-surface display, wherein the image sensor is a plurality of image sensors, which can be respectively disposed at any locations of the curved-surface display;
  the location is a distance between the viewer and the central line of the curved-surface display and a straight line distance between the viewer and the curved-surface display, if the viewer is located on the left of the central line of the curved-surface display and is X1 away from the central line, and the straight line distance between the viewer and the curved-surface display is D, the angle θL is arctan(−X1/D), and if the viewer is located on the right of the central line of the curved-surface display and is X2 away from the central line, and the straight line distance between the viewer and the curved-surface display is D, the angle θR is arctan (X2/D), wherein the θR is in a range of 0 to 90 degrees;
  the optimal visual angle information is θeff=(θL+θR)/2 and may be equal to a $$\theta_{\mathit{eff}} = \frac{1}{n}\sum_{k=0}^{n}\theta_k,$$

formula wherein n is a quantity of viewers;
  the θeff is in a range of 0 to 90 degrees, the optimal curvature is in a range of 4000 R to a plane, and the display surface bending distance is in a range of 50 mm to 0 mm; and
  the curved-surface display apparatus further comprises software or a corresponding program, to execute the method for a curvature of an adjustable curved-surface display.

* * * * *